United States Patent [19]

Moritani

[11] Patent Number: 4,792,484

[45] Date of Patent: Dec. 20, 1988

[54] COMPOSITION, PROCESS FOR PRODUCING THE SAME AND MULTI-LAYER STRUCTURE

[75] Inventor: Tohei Moritani, Kurashiki, Japan

[73] Assignee: Kuraray Co., Ltd., Kurashiki, Japan

[21] Appl. No.: 49,676

[22] Filed: May 13, 1987

[30] Foreign Application Priority Data

May 15, 1986 [JP] Japan .................................. 61-112373

[51] Int. Cl.⁴ .............................................. B32B 5/16
[52] U.S. Cl. .................................... 428/323; 428/516;
428/518; 428/704; 206/204; 252/194
[58] Field of Search ............... 428/516, 518, 323, 704;
206/204; 252/194

[56] References Cited

U.S. PATENT DOCUMENTS

| | | | |
|---|---|---|---|
| 4,407,897 | 10/1983 | Farrell et al. | 428/516 |
| 4,416,938 | 11/1983 | Haskell | 428/289 |
| 4,425,410 | 1/1984 | Farrell et al. | 428/516 |
| 4,464,443 | 8/1984 | Farrell et al. | 428/516 X |
| 4,576,988 | 3/1986 | Tanaka et al. | |
| 4,608,286 | 8/1986 | Motoishi et al. | |
| 4,613,644 | 9/1986 | Moritani et al. | |
| 4,619,849 | 10/1986 | Anzawa et al. | |
| 4,636,551 | 1/1987 | Okaya et al. | |
| 4,640,870 | 2/1987 | Akazawa et al. | |
| 4,645,695 | 2/1987 | Negi et al. | |
| 4,645,698 | 2/1987 | Matsubara | 206/204 |

*Primary Examiner*—Edith Buffalow
*Attorney, Agent, or Firm*—Kramer, Brufsky & Cifelli

[57] ABSTRACT

A composition comprising a matrix of an ethylene-vinyl alcohol copolymer having dispersed therein a granular drying agent in a particulate state, wherein the volume-area average diameter of the grains of drying agent having a long dia meter of not less than 10μ is not greater than 30μ. A multi-layer structure comprising layers of such a composition. The gas barrier property of the multi-layer structure is not substantially reduced after a retort treatment and thus, the multi-layer structure is extremely useful for packaging of food, especially packaging of retorted food.

8 Claims, 3 Drawing Sheets

COMPOSITION, PROCESS FOR PRODUCING THE SAME AND MULTI-LAYER STRUCTURE

FIELD OF THE INVENTION

The present invention relates to a composition exhibiting a high gas permeability resistance due to drying agent grains having good dispersion in an extremely particulate state in a blend of ethylene-vinyl alcohol copolymers (hereafter simply referred to as EVOH) and wherein the drying agent does not aggregate together, a process for producing the same and a multi-layer structure comprising the same.

BACKGROUND OF THE INVENTION

Brief Description of the Prior Art

Compositions comprising EVOH and drying agents are disclosed in U.S. Pat. Nos. 4,425,410 and 4,464,443, indicating that multi-layer structures foregoing comprising the compositions exhibit a small increase in oxygen permeability even after a retort (steam sterilization) treatment, as compared to when EVOH alone is used and are, therefore, preferable as packaging materials.

When a container is prepared in accordance with the method disclosed in the foregoing U.S. patents and employed for food storage, which requires a retort, gas permeability resistance is improved as compared to the case of using EVOH alone but the degree of the improvement is still insufficient and the container is unsatisfactory for purposes of improving storability of food which requires a steam sterilization treatment to a high degree. On the other hand, as a method for preventing increase in the rate of oxygen permeability upon retort treatment of multi-layer structures comprising EVOH, there are known methods which comprises blending a drying agent in an adhesive resin layer, etc. proximate to EVOH, as shown in U.S. Pat. No. 4,407,897 or Published Unexamined Japanese Patent Application No. 170748/82. In these cases, the adhesive resin layer containing the drying agent should be used in a thick thickness in order to obtain effective results. Such causes a problem from an economical viewpoint and in addition, the effects are not satisfactory from a practical standpoint (Comparative Example 4).

Under such circumstances, the present inventors have made extensive investigations on molding techniques over a wide range for purposes of controlling the blended state of a blend composition and studied the relationship between the blended state of the obtained composition and the rate of oxygen permeability of multi-layer structures therefrom upon a retort treatment. As a result, it has been found that the graininess and the dispersion state of the drying agent grains in an EVOH matrix greatly affect the rate of oxygen permeability. A composition free from the defects as described above was thereby obtained.

SUMMARY OF THE INVENTION

The present invention is directed to a composition comprising a matrix of an ethylene-vinyl alcohol copolymer having dispersed therein a granular drying agent in a particulate state. Wherein the grains having a long diameter of not less than $10\mu$ have a volume-area average diameter of greater than $30\mu$, a process for producing the same and a multi-layer structure comprising the composition as a layer(s).

The structure, especially a multi-layer structure, obtained using the composition of the present invention results in a high gas permeability resistance which is comparable to the state prior to the retort treatment and after the retort treatment. Containers prepared using such a multi-layer structure are extremely useful for packaging of a wide range food.

BRIEF DESCRIPTION OF THE DRAWINGS

FIG. 1-2 is a schematic drawing of FIG. 1-1 illustrating the dispersion of drying agent grains in the matrix.

FIG. 2-1 is a photomicrograph (200×) showing the degree of dispersion of the powder is another polypropylene-adhesive resin film.

FIG. 2-2 is a schematic drawing of FIG. 2-1 illustrating the matrix and a dispersion of drying agent grains and drying agent grains having large graininess.

DETAILED DESCRIPTION OF THE INVENTION

Figure 1:
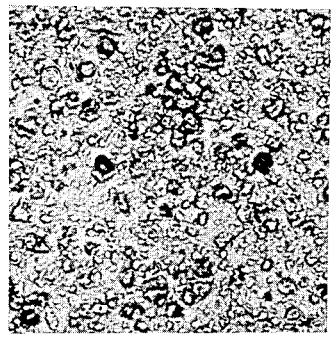
FIG. 1-1 is a photomicrograph (200×) showing the degree of dispersion of powder in a polypropylene-adhesive resin film.

The ethylene-vinyl alcohol copolymer (EVOH) as used in the present invention is a product of hydrolysis of a copolymer of ethylene and vinyl acetate. Copolymers which are suitable for the purposes of the present invention include those having an ethylene unit content of 25 to 60 mol% and a saponification degree in the vinyl acetate component of at least 96%, preferably at least 99%. For the melt index value (190° C., 2160 g), a range of 0.2 to 60 g/10 mins. is appropriate. Further the EVOH referred to in the present invention may be those modified with a copolymerizable monomer in a range of not greater than 5 mol%. Examples of such monomers include propylene, 1-butene, 1-hexene, 4-methyl-1-pentene, acrylic acid esters, methacrylic acid esters, maleic acid, fumaric acid, itaconic acid, higher fatty acid vinyl esters, alkyl vinyl ethers, N-(2-dimethylaminoethyl)methacrylamides or quaternized products thereof, N-vinylimidazole or quaternized products thereof, N-vinylprrolidone, N-n-butoxymethylacrylamide, vinyltrimethoxysilane, vinylmethyldimethoxysilane, vinyldimethylmethoxysilane, and the like.

As the EVOH matrix, two or more EVOH resins having different compositions can be used as a mixture. Further additives, for example, coloring agents such as pigments, dyes, etc.; antistatic agents, UV absorbants, plasticizers, heat stabilizers, lubricants, etc. can be incorporated in the matrix within a range that does not impair the effects of the present invention.

Further the drying agent referred to in the present invention, includes salts capable of forming hydrates, namely, salts which absorb water as crystalline water, in particular, phosphates such as monosodium phosphate, disodium phosphate, trisodium phosphate, trilithium phosphate, sodium pyrophosphate, and the like, particularly anhydrides thereof are most preferred for the present invention. Other hydrate-forming salts, for example, sodium borate, sodium sulfate, etc. and particularly anhydrides thereof are also suitable for use in the present invention. Further other hygroscopic compounds, for example, sodium chloride, sodium nitrate, sugar, silica gel, bentonite, molecular sieves, highly water-absorbable resins, and the like may also be used. These drying agents can be used in an admixture of two or more simultaneously.

In the present invention, it is necessary that the drying agent be dispersed in the matrix of EVOH as fine grains and the drying agent grains exhibiting a long diameter of 10μ or more have a volume-area average diameter of not greater than 30μ, preferably 25μ or less, most preferably 20μ or less. By forming such a fine dispersion state, the multi-layer structure having a high gas permeability resistance that has not been hitherto achieved can be obtained. The composition having such a fine dispersion state can be obtained only by careful combination of the particular processings suited for this purpose.

First, it is desired to pay special attention to the drying agent in such a manner that the drying agent having a grain diameter as fine as possible be obtained upon precipitation from an aqueous solution of the salts through spray drying, etc. The drying agent grains can be classified into 30μ or less, preferably 10μ or less and then provided for use. But in general, the dried salts are subjected to pulverization using a jet grinder, an impact grinder, a ball mill, a vibration ball mill, etc. The ground grains are classified into ultrafine grains of 30μ or less, preferably 10μ or less, using a classification machine such as an air classification machine, etc. The 30μ or less as used herein means that the grains exceeding 30μ are less than 0.01% in the volume fraction, namely, the fine grains of 30μ or less are present at least 99.9%. The graininess of the ultrafine grains is a value determined by the Coulter counter method. Upon the measurement of the graininess, the grains are preliminarily sieved through a sieve having a mesh of 10 to 75μ, if necessary, in order to condense a small amount of coarse grains. The coarse grains on the sieve are analyzed by the Coulter counter method so that the coarse grains can be analyzed with high accuracy.

Next, the ultrafine grains of drying agent described above are mixed with EVOH. For mixing, there is a method for mixing the fine grains of the drying agent with powders, grains or pellets of EVOH using a conventional mixer, for example, a Henschel mixer, a super mixer, a tumbling mixer, etc.; a method which comprises mixing the fine grains of the drying agent with a melt of EVOH to make a master batch and mixing the master batch with powders, grains, pellets or melts of EVOH. Then, the mixture is kneaded at temperatures higher than the melting point of EVOH to prepare the composition. EVOH and the drying agent grains may also be directly fed in a kneader to effect kneading, without preliminary mixing of EVOH and the drying agent grains as described above. Upon this kneading operation, the fine grains of the drying agent tend to be aggregated with each other; even if the fine grains of 10μ or less are used. The remarkable effects of the present invention cannot be obtained if the fine grains are agglomerated and agglomerates exceeding the volume-area average diameter set in the present invention are formed. Accordingly, the kneading operation is extremely important in the present invention. To obtain a composition having a high dispersion state, continuous twin rotor kneaders such as a continuous intensive mixer, a kneading type twin screw extruder (same directions or different direction), etc. can be employed Batch type twin rotor extruders such as a Banbury mixer, an intensive mixer, a pressure kneader, etc. can be used. Useful continuous mixing devices, include rotary disks having an attrition mechanism such as a stone mill, e.g., KCK Kneader Extruder manufactured by KCK Co., Ltd. Among kneaders conventionally used, there is a single screw kneader equipped with a kneading part (Dulmage, CTM, etc.) or handy type kneaders such as a Brabender mixer, etc.; in the case of using such kneaders, however, it is difficult to obtain the excellent composition of the present invention.

Of these kneaders, the most preferred kneader for the purposes of the present invention is a continuous intensive mixer. Commercially available models are FCM manufactured by Farrel Co., Ltd., CIM manufactured by The Japan Steel Works, Ltd., KCM, NCM, LCM or ACM manufactured by Kobe Steel, Ltd. and the like. From a practical standpoint, it is preferred that a device equipped with a kneader having a mounted single screw extruder beneath the kneader be used to perform kneading and extrusion pelletization simultaneously.

For the kneading purpose of the present invention, there may also be used a twin screw kneading extruder having kneading disks or kneading rotors, for example, TEX manufactured by The Japan Steel Works, Ltd., ZSK manufactured by Werner & Pflenderer Co., Ltd., TEM manufactured by Toshiba Machine Co., Ltd., PCM manufactured by Ikegai Iron Works, Inc., etc.

In using these continuous kneaders, the shape of the rotor or disk plays an important role. In particular, a gap (tip clearance) between mixing chamber and rotor tip or disk top is important; if the gap is too narrow or two wide, the composition of the present invention having good dispersion cannot be obtained. It is most preferred that the tip clearance be in the range of 1 to 5 mm. In order to obtain the composition of the present invention having good dispersion, it has been found that kneading should be made in a unit work of the kneader of at least 0.1 kwh/kg, preferably 0.2 to 0.8 kwh/kg. The unit work is determined by dividing energy (quantity of electric power consumed, kw) used for the kneading by an amount (kg) of the kneading treatment per hour and its unit is kwh/kg. In order to produce the composition of the present invention, it is required that the kneading be performed at a unit work value higher than that adopted for conventional kneading. To render the unit work at least 0.1 kwh/kg, it is insufficient to merely increase the rotation number of a kneader, but it is preferred to cool the composition during kneading with a jacket, etc. thereby lowering the temperature and increasing the viscosity. If the kneading is conducted in a state where the viscosity is low, it is difficult to obtain the composition contemplated in the present invention. Accordingly, it is effective to conduct the kneading at a kneading temperature ranging from the melting point of EVOH to a temperature higher than the melting point by 60° C., more preferably ranging from the melting point of EVOH to a temperature higher than the melting point by 40° C., as measured at a discharged resin temperature in an outlet of a kneading part.

It is desired that the rotation number of a rotor of the kneader be in the range of 200 to 1200 rpm, more preferably 400 to 1200 rpm. The inner diameter of the chamber in the kneader is generally 30 mm or more, preferably in the range of 50 to 400 mm (D). It is preferred that L/D of the kneader be 4 to 10. Further, a single or two or more kneaders combined together may be used.

The longer the kneading time, the better the results. In view of thermal deterioration or change of EVOH or from an economic standpoint, however, the kneading time is generally in the range of 10 to 600 seconds, preferably 20 to 200 seconds, most preferably 20 to 100 seconds.

There is no particular restriction as to the ratio of EVOH to the drying agent used, but the ratio of 97:3 to 50:50, particularly 95:5 to 70:30, by weight, is preferred.

Measurement of the graininess of the drying agent grain in the composition is made by the microscopic method. In general, the graininess is determined by visual observation or an image analysis device with respect to a photograph of the grains. In the present invention, it is required that among the dispersed grains, the volume-area average diameter of the grains having a long diameter of 10μ or more is not greater than 30μ. The long diameter as used herein means the distance between two parallel lines which give the longest distance when a projected image of each grain is inserted between the parallel lines. Regarding the grains having a long diameter of 10μ or more, an average grain diameter must be determined. Various methods are known to determine the average grain diameter. A convenient method suited for the purpose of the present invention is that an average value D of a long diameter L and a diameter B in the direction rectangular to L is rendered an average diameter. This method is one of the methods often adopted by one skilled in the art. Thus, when its average diameter $D_N$ is determined with respect to N numbers of grains in an appropriate measurement range (200μ×200μ), its volume-area average diameter $D_{AV}$ is defined as follows:

$$D_{AV} = \Sigma D_N^3 / \Sigma D_N^2$$

As has been made clear in the present invention, the volume-area average diameter of the grains having a long diameter of at least 10μ, among the drying agent grains in the composition of the present invention, greatly affects the gas permeability resistance of the multi-layer structure comprising this composition as a layer(s). The reason is not necessarily clear but it is assumed that grains having a large grain diameter would be particularly disadvantageous due to a hygroscopic effect or gas permeability resistance of EVOH.

From a practical viewpoint, it is most effective to use the thus obtained composition in a multilayered structure with other thermoplastic resins. Examples of useful thermoplastic resins include polyolefin resins, polyamid resins, polyester amide resins, polyester resins, polystryrene resins, polyvinyl chloride resins, acrylic resins, polyvinylidene chloride resins, polyurethane resins, polyacetal resins, polycarbonate resins, and the like. Among them, particularly important for the present invention in their effects and practical efficiencies are the polyolefin resins. The polymide resins, polyester resins and polystyrene resins are also important.

Examples of the polyolefin resins include polyethylene of high density, medium density or low density; polyethylene copolymerized with vinyl acetate, an acrylic acid ester, or α-olefins such as butene, hexene, 4-methyl-1-pentene, and the like; ionomer resins, polypropylene homopolymer, polypropylene graft-copolymerized with ethylene, or polypropylene copolymerized with α-olefins such as ethylene, butene, hexene, 4-methyl-1-pentene, and the like; poly-1-butene, poly-4-methyl-1-pentene, or modified polyolefins obtained by reacting the aforesaid polyolefins with maleic anhydride, etc.

Examples of the polyamide resins include polycapramide (nylon-6), poly-ω-aminoheptanoic acid (nylon-7), poly-ω-aminononaic acid (nylon-9), polyundecanamide (nylon-11), polylaurine lactam (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylenedodecamide (nylon-6,12), polyoctamethylene adipamide (nylon-8,6), polydecamethylene adipamide (nylon-10,6), polydodecamethylene sebacamide (nylon-10,8), or a caprolactam/laurin lactam copolymer, caprolactam/hexamethylene diammonium adipate copolymer, laurine lactam/hexamethylene diammonium adipate copolymer, hexamethylene diammonium adipate/hexamethylene diammonium sebacate copolymer, ethylenediammonium adipate/hexamethylene diammonium sebacate copolymer, ethylene diammonium adipate/hexamethylene diammonium adipate copolymer, caprolactam/hexamethylene diammonium adipate/hexamethylene diammonium sebacate copolymer, and the like.

Representative examples of the polyester resins include poly(ethylene terephthalate)(PET), poly(butylene terephthalate), poly(ethylene terephthalate/isophthalate), poly(ethylene glycol/cyclohexane dimethanol/terephthalate), and the like and also include these polymers which contain as a copolymer component a diol such as ethylene glycol, butylene glycol, cyclohexane dimethanol, neopentyl glycol, pentanediol, and the like; a dicarboxylic acid such as isophthalic acid, benzophenonedicarboxylic acid, diphenylsulfone dicarboxylic acid, diphenylmethane dicarboxylic acid, propylenebis(phenylcarboxylic acid), diphenyloxide dicarboxylic acid, oxalic acid, malonic acid, succinic acid, glutaric acid, adipic acid, pimelic acid, sberic acid, azelaic acid, sebacic acid, diethylsuccinic acid, etc.

Examples of the polyvinyl chloride resins include a homopolymer of vinyl chloride alone and in addition thereto, a copolymer with vinyl acetate, a maleic acid derivative, a higher alkyl vinyl ether, and the like.

Examples of the polystyrene resin include a homopolymer of styrene alone and in addition thereto, polystyrene obtained by graft copolymerization with butadiene, a styrene-butadiene rubber mixture, a styrene-maleic anhydride copolymer, and the like.

The thermoplastic resins used in the present invention may also be used as an admixture of two or more.

It has been experimentally confirmed that the dispersion state of the fine graines of the drying agent in the composition does not principally change during the step of forming the multi-layer structure comprising of the composition of the present invention in combination with the other thermoplastic resins described above.

The multi-layer structure of the present invention is molded into films, sheets, cups, bottles, tubes, and the like by subjecting the composition of the present invention and the other thermoplastic resin to molding processing such as a co-extrusion molding method, a multi-layered co-injection molding method, a heat molding method, and the like. It is generally preferred that the composition of the present invention be used as an intermediate layer and the inner and outer layers be composed of thermoplastic resins such as polyolefins, and the like. In the case of preparing multi-layer structure, it is preferred to use an interlayer adhesive resin. There is no particular restriction to such an interlayer adhesive resin but representative examples include resins obtained by modifying (addition, grafting, etc.) thermoplastic resins (polyethylene, polypropylene, an ethylene-vinyl acetate copolymer, an ethylene-acrylic acid ester copolymer, and the like) with an ethylenically unsaturated carboxylic acid or an anhydride thereof (maleic anhydride, etc.). In addition, polyesters having bound thereto an aluminum element and a monocarboxylic acid as described in Published Unexamined Japanese Patent Application No. 115327/84 may be used.

When the thermoplastic resins, the EVOH composition and the adhesive resin are designated A, B and C, respectively, the layer construction of the multi-layer structure can be A/B, A/C/B, A/B/A, A/C/B/C/A, A/B/A/B/A, A/C/B/C/A/C/B/C/A, etc. but is not limited thereto.

The multi-layer structure of the present invention is characterized by employing the drying agent grains in the layer of EVOH in a highly dispersed state. Layers other than the EVOH layer, for example, a layer of the adhesive resin, may also contain the drying agent.

The multi-layer structure of the present invention is readily distinguishable from conventionally known plastic materials because gas permeability resistance, under high humidity especially gas permeability resistance when a retort treatment is performed, high in comparison to that of the plastic materials. The retort treatment is generally performed at 120° C. by putting a container having food packed therein in an autoclave called a retort pot. The treatment time varies depending upon the kind of food; 20 minutes is sufficient for some foods whereas others require treatment for 120 minutes. The multi-layer structure of the present invention is extremely useful even for food containers which require so called boiling sterilization in which sterilization is effected in boiled water under normal pressure.

It has also been confirmed that the multi-layer structure of the present invention exhibits sufficiently high gas permeability resistance to for use where neither retort treatment nor boiling treatment is performed. Particularly in the case that the inner and outer layers are composed of resins having high moisture permeability such as polystyrene, polyvinyl chloride, polyester, etc., there is a tendency that moisture in the container (or outside the container) permeates through the inner and outer layers reducing the gas permeability resistance of the EVOH in the case that the multi-layer structure is of a film shape. However, in the multi-layer structure containing the composition of the present invention, the effect of retaining gas permeability resistance is great, the period for storage of food can be markedly prolonged and the industrial significance is great.

Next, there are various processes for producing the multi-layer structure of the present invention as described above. In particular, the production of the multi-layer structure by multi-layer injection molding is described hereafter.

For the multi-layer injection molding of the present invention, various known modes are used and include (1) simple multi-layer injection molding, (2) multi-layer injection direct blow molding and (3) multi-layer injection drawing blow molding. In the case of (1), the mode comprises injection-molding a plasticized resin directly into a container mold in a multi-layer form as a concentric multi-layer structure and dwelling, which is per se known in Published Examined Japanese Patent Application Nos. 39174/86 and 9007/87. Modes (2) and (3) comprise injection-molding into a parison (also sometimes called prefoam) mold in a multi-layered form to mold a concentric multi-layered closed-end parison, transferring the closed-end parison into a blow mold and subjecting to blow foaming by a pressure fluid such as compressed air, compressed nitrogen, etc. The differences between (2) and (3) lie in that in (2) the parison is transferred into the blow mold together with a core having a pressure fluid blowing inlet while the parison is not completely cooled but substantially in a melt state. Whereas in (3), the parison is generally once cooled to separate from the core, reheated at temperatures higher than the glass transition temperature (generally the softening point) but lower than the melting point (or the plasticizing temperature) and then transferred to the blow mold, and a blowing core equipped with a drawing rod is newly inserted to draw the closed-cell parison in the blow mold to the axis direction and at the same time or thereafter, the pressure fluid is blown to effect blow forming. From the aspect of physical properties, it is different in that orientation of the resin hardly occurs in (2) whereas in (3), orientation occurs. These differences are disclosed in, for example, Published Examined Japanese Patent Application No. 8971/83 and Patent Disclosure No. 501082/81, and Published Unexamined Japanese Patent Application No. 34819/85, with respect to (2). Also with respect to (3), the differences are disclosed in Published Unexamined Japanese Patent Application Nos. 128520/82, 240409/85, 152411/86, 173924/86, 203332/86, 219644/86, 235126/86 and 152412/86. The significance of the co-injection of the present invention is described below in more detail. The co-injection means a method for molding by closing operation once using a plurality of injection cylinders. To the contrary, according to a known method, large mold cavities are sequentially used by the number of layers; first, injection molding is performed using a mold cavity for a first layer and then, the mold cavity for the first layer is opened and its primary molded article is put in a larger mold cavity for a second layer. A resin for the second layer is injected into a gap formed between the mold cavity for the second layer and the primary molded article followed by thermal fusion of the primary molded article and the resin for the second layer. The thus obtained two-layer secondary molded article is subjected to injection molding using a mold cavity larger than the secondary molded article thereby to mold in 3 layers. Such a multi-stage injection molding involves increased numbers of molds and steps and a long cycling time.

For brevity of explanation, the co-injection will be described, taking as an example a container composed of 2 kinds of the resins and 3 layers using thermoplastic resin A in the innermost and outermost layers and EVOH having dispersed therein the drying agent (hereafter referred to as EVOH composition) as the intermediate layer. As the multi-layer injection device, a device equipped with 2 injection cylinders is used. First the resin A is primarily injected in part into a mold from a nozzle through a hot runner block via a mold gate to halfway fill the mold with the resin A. The EVOH composition molding the intermediate layer is concentrically injected simultaneously or sequentially during of after the primary injection to form the intermediate layer. After completion of the injection of the EVOH composition, resin A is injected (secondary injection) to completely envelope the EVOH composition layer therein. With respect to structure of a hot runner, the order of injection such as simultaneous injection, sequential injection, etc., timing of injection, there are various modifications and the present invention is not limited to the example described above. In summary, the key of the co-injection according to the present invention is that while forming a skin layer by primarily injecting the resin for forming the innermost and outermost layers, the EVOH composition as the core is injected (in this case, the resin A is generally injected in parallel to spread the EVOH composition) and finally the resin for forming the innermost and outermost layers thereby to fully seal the EVOH composition therein. When the edge surface of the EVOH composition is exposed, moisture is absorbed from the edge surface so that a poor appearance such as whitening is caused and such is not preferred.

Hereafter the present invention will be described more specifically with reference to the examples below, wherein parts are by weight unless otherwise indicated.

EXAMPLE 1

Anhydrous disodium phosphate powders were micronized and classified using a jet grinder (Micron Jet Model MJ-3, manufactured by Hosokawa Micron Co., Ltd.) and an air classification machine (Micron Separator, manufactured by the same company). By observation of raw powdery grains with a test glass using methanol as a dispersant, it was confirmed that a number of grains of $500\mu$ or more were present and the average grain diameter (median diameter) was $86\mu$ according to the Coulter counter. After pulverization was performed in a similar manner, the maximum grain diameter (according to the Coulter counter) was $13\mu$ and its median diameter was $6.4\mu$ (grains having a grain diameter exceeding $13\mu$ were less than 0.1% in volume fraction).

After premixing a mixture of 20 parts of the anhydrous disodium phosphate fine powders and 80 parts of EVOH [ethylene unit content of 32 mol%, melt index of 1.3 g/10 mins. at 190° C. under a load of 2160 g, melting point of 181° C. {main endothermic peak temperature at DSC (scanning speed) 10° C./min}] pellets in a Henschel mixer, high speed mixing was performed to obtain the mixture. Then, kneading, extrusion and pelletization were performed using a counter-rotating continuous kneader (LCM-50, manufactured by Kobe Steel, Ltd.) with two-stage mixing rotors having an inner diameter of the mixing chamber of 54 mm (D), L/D of 5.8 (first stage) and L/D of 4.2 (second stage) and having a vent at the second-stage screw section, having connected therewith a single screw extruder.

The mixing rotor adopted in this case has tip clearance with the mixing chamber of 3 mm. The operation was performed at a kneading temperature (outlet temperature) of 206° to 220° C. for a kneading time of 30 to 40 seconds at a rotor rotation number of 530 to 650 rpm in a unit work of 0.3 to 0.6 kwh/kg. The pellets obtained were designated Composition 1.

The thus obtained pellets were subjected to a hot press machine at 220° C. to give a thin layer having a thickness of approximately $100\mu$. By an optical microscope, the dispersion state of the powders in this thin layer was observed. A photograph having an enlargement magnification of 800 times was obtained. In order to improve the depth of the focus, the enlargement magnification was 50 times and the drawing magnification of the photograph was increased to 800 times. With respect to 10 samples prepared in the same way, the average diameter of grains having a long diameter of $10\mu$ or more in a region of $200\mu \times 200\mu$ were measured, and the volume-area average diameter was calcuated to be $17.6\mu$.

Next, using a co-extrusion sheet molding device equipped with 3 extruders and having 3 kinds-5 layers type feed block, a die for sheet molding and a puller, co-extrusion was performed to give a multi-layer structure of a polypropylene/adhesive resin/the above-described composition/adhesive resin/polypropylene (thickness: $600/50/100/50/600\mu$). Polypropylene and the adhesive resin used herein were UBE POLYPRO E-103D manufactured by Ube Industries, Ltd. and ADMER QF-500 (polypropylene modified with maleic anhydride) manufactured by Mitsui Petrochemical Industries, Ltd., respectively. Next, using a vacuum air pressure forming machine (manufactured by Asano Seisakusho Co., Ltd.), heat forming of this sheet was performed to prepare a cup container (opening diameter of 72 mm, bottom diameter of 65 mm, height of 35 mm).

The cup was subjected to a steam heating treatment at 120° C. in a retort pot by 3 kinds for 30, 60 and 120 minutes, the cup was withdrawn. In such a state that water was charged in the inside of the cup, the opening of the cup was connected with a device for measuring oxygen gas permeability (manufactured by Modern Controls Co., Ltd.) and the rate of oxygen permeability was measured (20° C., 100% RH in the inside, 65% RH in the outside). The results are shown in Table 1. The rate of oxygen permeability after the retort treatment was approximately twice or less than that of a container which was not retorted, and gas permeability resistance was sufficient for storage of food.

Figures 1, 2:
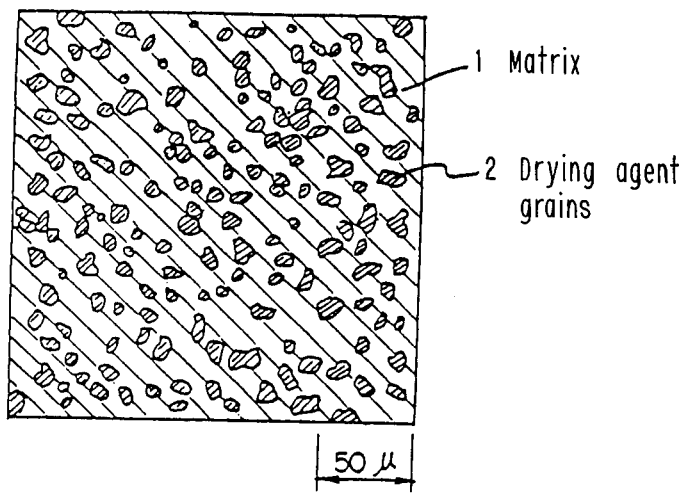
Figures 1, 2:
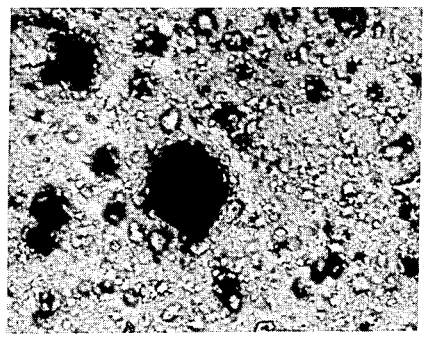
Figure 2:
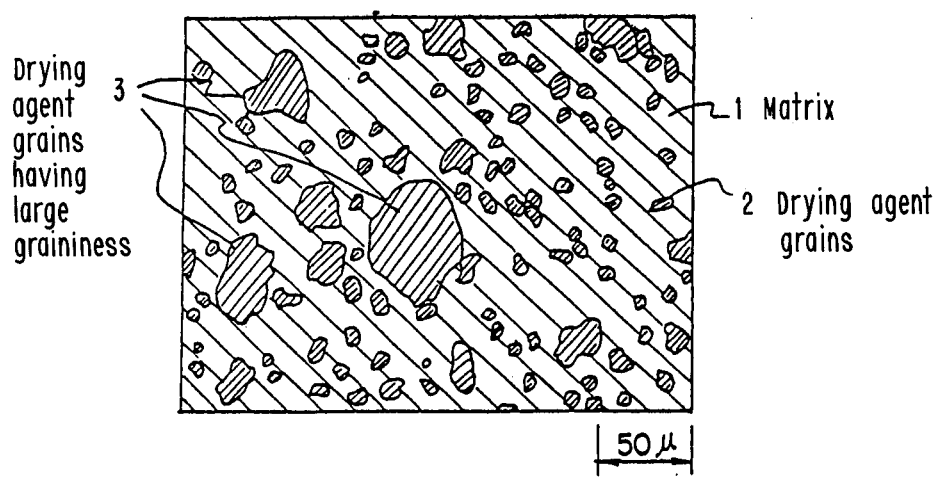

A part of the cup container prior to the retort treatment was cut, taken out and heated in xylene at 120° C., whereby polypropylene and the adhesive resin were melted out to give a film of the composition in the container. The dispersion state of the powders in this film was observed by an optical microscope. A photograph having an enlargement magnification of 800 times was obtained. In order to improve the depth of the focus, the enlargement magnification was 50 times and the drawing magnification of the photograph was increased to 800 times (FIG. 1-1 is a photograph of the same object enlarged to 200 times and FIG. 1-2 is its model wherein numeral 1 denotes a matrix and numeral 2 denotes drying agent grains). With respect to 10 samples collected from the wall of the container at different locations, grains having a long diameter of $10\mu$ or more in a region of $200\mu \times 200\mu$ were measured with their average diameter, respectively, and the volume-area average diameter was calculated to be $17.7\mu$.

COMPARATIVE EXAMPLES 1 TO 3

Co-extrusion molding, thermoforming and retort treatment were performed in a manner similar to Example 1 except for using EVOH (that shown in Example 1) in place of the composition shown in Example 1 and, the rate of oxygen permeability was measured. The results (Comparative Example 1) are also shown in Table 1. Notwithstanding that the oxygen permeability rate was the same as that prior to the retort treatment, the oxygen permeability rate after the retort treatment was 10 to 100 times that of Example 1.

On the other hand, 20 parts of anhydrous disodium phosphate fine powders described in Example 1 and 80 parts of EVOH described in Example 1 were premixed and then the mixture was subjected to kneading, extrusion and pelletization at a temperature of 220° C. using an ordinary full-flighted type single screw extruder (inner diameter of the cylinder, 50 mm) to give pellets (this was designated Composition 2). Further kneading was performed in a manner similar to Example 1 except that the unit work of the continuous twin rotor kneader upon kneading was 0.08 kwh/kg (this is designated Composition 3). Co-extrusion molding, heat forming and retort treatment were performed in a manner similar to Example 1 except for using Composition 2 or Composition 3 described above in place of the composition of Example 1. Thereafter, each oxygen permeability rate was measured and the results are shown in Table 1 as Comparative Examples 2 and 3. The oxygen permeability rates in Comparative Examples 2 and the 3 were 10 to 40 times that of Example 1 and gas barrier properties were inferior to that of Example 1.

A part of the cup container prior to the retort treatment was cut, taken out and heated in xylene at 120° C., whereby the polypropylene and the adhesive resin were melted out to give a film of the composition of the present invention in the container. The dispersion state of the powders in this film was observed by an optical microscope. A photograph having an enlargement magnification of 800 times was obtained. In order to improve the depth of the focus, the enlargement magnification was 50 times and the drawing magnification of the photograph was increased to 800 times (FIG. 2-1 shows a photograph of the same object enlarged to 200 times and FIG. 2-2 shows its model wherein numeral 1 denotes a matrix, numeral 2 denotes drying agent grains and numeral 3 denotes drying agent grains having large graininess). With respect to 10 samples collected from the wall of the container at different locations, the average diameter of grains having a long diameter of $10\mu$ or more were measured and the volume-area average diameter was calculated to be $56.9\mu$. Further measurement was made with respect to Comparative Example 3 in a similar manner and the volume-area average diameter was $36.8\mu$.

EXAMPLES 2 TO 10

Various drying agents were micronized and used in place of the anhydrous disodium phosphate fine powders of Example 1. Kneading and extrusion were performed together with EVOH (shown in Example 1) in a manner similar to Example 1 to give pellets of the respective compositions. Further co-injection extrusion molding, thermo forming and retort treatment were performed and the oxygen permeability rate of the container obtained was measured. The intermediate layer of each cup was taken out and the volume-area average diameter ($D_{AV}$) of grains having a long diameter of $10\mu$ or more among the dispersed drying agent grains was determined by microscopic observation. The results are shown in Table 2.

The gas barrier property of the compositions of the present invention, especially the gas barrier property of the cups using the drying agents of Examples 2 to 5, after the retort treatment, is extremely high and sufficient for storage of most foodstuffs. Further in Examples 6, 7 or 8 to 10, remarkable gas permeability resistance is noted with the retorted time of 30 to 60 minutes which are useful for many foodstuffs sufficient for a retort treatment at this level. However, with a retort treatment for 120 minutes, there is a tendency that gas barrier property decreases.

TABLE 1

| | Intermediate Layer | Oxygen Permeability Rate of Cup ($\times 10^{-2}$ cc/container · day · atm) | | | |
|---|---|---|---|---|---|
| | | Non-Retorted | Retorted for 30 mins. | Retorted for 60 mins. | Retorted for 120 mins. |
| Example 1 | Composition 1 | 0.30 | 0.35 | 0.50 | 0.8 |
| Comparative Example 1 | EVOH | 0.32 | 20 | 50 | 108 |
| Comparative Example 2 | Composition 2 | 0.30 | 3 | 9 | 20 |
| Comparative Example 3 | Composition 3 | 0.30 | 3 | 5 | 10 |

TABLE 2

| | | | Oxygen Permeability Rate of Cup ($\times 10^{-2}$ cc/container · day · atm) | | | |
|---|---|---|---|---|---|---|
| Example | Drying Agent | $D_{av}$, $\mu$ | Non-Retorted | Retorted for 30 mins. | Retorted for 60 mins. | Retorted for 120 mins. |
| 2 | Anhydrous sodium pyrophosphate | 24.8 | 0.21 | 0.3 | 0.5 | 2 |
| 3 | Anhydrous trisodium phosphate | 12.9 | 0.28 | 0.4 | 0.4 | 0.5 |
| 4 | Anhydrous monosodium phosphate | 12.8 | 0.29 | 0.6 | 0.7 | 0.9 |
| 5 | Anhydrous trilithium phosphate | 21.5 | 0.20 | 0.3 | 0.3 | 0.3 |
| 6 | Anhydrous sodium borate | 13.1 | 0.19 | 0.5 | 1.8 | 9.5 |
| 7 | Anhydrous sodium sulfate | 13.0 | 0.33 | 0.6 | 2.5 | 8.4 |
| 8 | Sodium nitrate | 17.6 | 0.30 | 0.6 | 6.3 | 15.9 |
| 9 | Sodium chloride | 15.5 | 0.35 | 0.7 | 5.5 | 14 |
| 10 | Sugar | 21.0 | 0.43 | 0.8 | 7.1 | 18.9 |

EXAMPLE 11 AND COMPARATIVE EXAMPLES 4 AND 5

Figure 3:
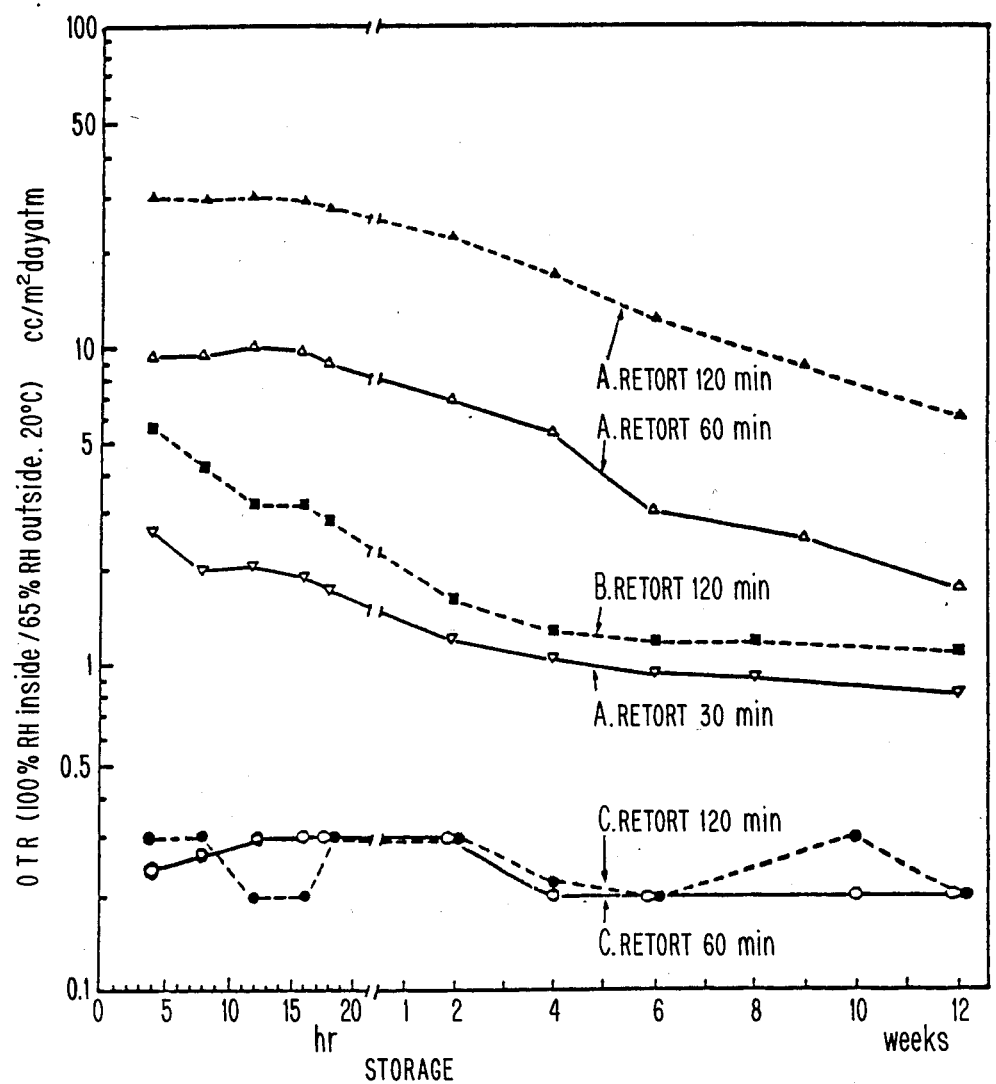
FIG. 3 is a graphical representation of the change in oxygen permeability rate (OTR) during storage over 12 weeks.

Co-extrusion was carried out using a co-extrusion sheet molding device as used in Example 1 to give a multi-layer structure sheet having a construction of polypropylene/adhesive resin/Composition 1/adhesive resin/polypropylene (thickness: 217/40/48/37/225μ) (Sheet C). After this sheet was subjected to a steam heating treatment at 120° C. in a retort pot (60 and 120 minutes), one surface was exposed to a RH of 100% and the other surface was exposed to a RH of 65%. The oxygen permeability rate (OTR) was measured at 20° C. over a period of time. The change in OTR during storage for 12 weeks is shown in FIG. 3-C. The sheet shows OTR of 0.2 to 0.3 cc/m².day.atm 3 hours after the retort treatment.

On the other hand, 90 parts of adhesive resin (Admer QF-500) and 10 parts of anhydrous disodium phosphate fine powders used in Example 1 were premixed and then the mixture was subjected to kneading, extrusion and pelletization using a continuous extruder as used in Example 1 to give pellets of the adhesive resin composition containing the drying agent (this was designated Composition 4). A sheet having a thickness and construction corresponding to Sheet C of Example 11 was obtained in a manner similar to Example 11 except that EVOH (ethylene unit content of 32 mol%, melt index at 190° C. of 1.3 g/10 mins.) was used in place of Composition 1 and Composition 4 described above was used in place of the adhesive resin (Comparative Example 4, Sheet B).

After this sheet was subjected to a steam heating treatment at 120° C. in a retort pot for 120 minutes, OTR was measured over a period of time under the same conditions as in Example 11. The results are shown in FIG. 3-B.

For control, a sheet having a thickness and construction corresponding to Sheet C of Example 11 was obtained in a manner similar to Example 11 except that EVOH described above was used in place of Composition 1 in Example 11 (Comparative Example 5, Sheet A). After this sheet was subjected to a steam heating treatment at 120° C. in a retort pot for 30, 60 and 120 minutes, the cup was withdrawn, OTR was measured over a period of time under the same conditions as in Example 11. The results are shown in FIG. 3.

In FIG. 3, Sheet A of Comparative Example 5 shows the OTR values of 2.6 (retorted for 30 minutes), 9.5 (retorted for 60 minutes) or 30 (retorted for 120 minutes) cc/m².day.atm which gradually decreases during storage; on the other hand, the multi-layer structure or Sheet C of Example 11 of the present invention shows OTR less than 0.3 cc/m².day.atm for 3 hours to 12 weeks after the retort treatment. Further Sheet B of Comparative Example 4 containing the drying agent in the adhesive resin shows lower OTR than that in Comparative Example 5 retorted for 120 minutes but OTR after the retort treatment is 10 times or more than the sheet of the present invention. It is thus evident that the multi-layer structure of the present invention shows a markedly low OTR after the retort treatment.

EXAMPLE 12 AND COMPARATIVE EXAMPLE 6

A composition similar to Composition 1 of Example 1 was obtained except that EVOH (ethylene unit content of 32 mol%, melt index at 190° C. under load of 2160 of 4.4 g/10 mins., melting point of 181° C.) was used in place of Composition 1 in Example 1 (Composition 5).

A multi-layer draw-blowing container having an inner volume of 700 ml, which had an intermediate layer of Composition 5 and inner and outer layers of polyethylene terephthalate resin (hereafter simply referred to as PET (1)) having an intrinsic viscosity [η] (dissolved in a solvent mixture of 50 wt% of phenol and 50 wt% of tetrachloroethane and measured at a temperature of 30° C.) of 0.75 was prepared by co-injection molding. Namely, using a co-injection molding device equipped with two injection cylinders A and B, PET (1) was charged in cylinder A (inner diameter of 38 mm) at a barrel temperature of 285° C. and Composition 5 was charged in cylinder B (inner diameter of 16 mm) at a barrel temperature of 240° C. Then a part of PET (1) was injected first into a parison cavity set at a temperature of 20° C. from a nozzle through a hot runner set at 280° C. via a mold gate. The injection of PET (1) was discontinued for 1 to 2 seconds after the initiation of the injection and at the same time, Composition 5 was concentrically injected into the aforesaid parison cavity from the nozzle through the hot runner via the mold gate. After discontinuation of the injection for 0.1 second, PET (1) was again injected together with Composition 5. By setting the amount of PET (1) injected in this case larger than the resin amount of Composition 5 injected simultaneously, filling was made in such a manner that the fluidizing tip of Composition 5 was finally enveloped in the fluidizing tip of PET (1). Then, the injection of Composition 5 was discontinued and somewhat thereafter, the injection of PET (1) was discontinued. Thus, Composition 5 could be completely enveloped by PET (1) by fully filling with the resin in the parison cavity. The total injection time was 2.8 seconds. After dwelling, the mold was opened and the obtained multi-layer parison was transferred to a temperature-controlled pot. The temperature of the multi-layer parison was set at 110° C. and then the thus temperature-controlled multi-layer parison was transferred to a blow mold and drawn twice with drawing rods in the axis direction; almost simultaneously, the multi-layer parison was drawn 3 times with compressed air of approximately 10 kg/cm² to the peripheral direction to fit along the shape of the mold. After cooling, the product was withdrawn to prepare a container having a weight of 26 g and a volume of 700 ml.

The total thickness of the thus obtained multi-layer draw blown container was 300μ at the peripheral side wall of the waist and the layer construction was inner layer of PET (1) (160μ)/intermediate layer of Composition 5 (40μ)/outer layer of PET (1) (100μ). At the same time, a multilayer container was prepared in almost a similar manner except that a resin of EVOH alone (ethylene unit content of 32 mol%, melt flow index at 190° C. under a load of 2160 g of 5.1 g/10 mins.) was used in place of Composition 5 and comparison was made.

The total thickness of the thus obtained multi-layer draw blown container was 300μ at the peripheral side wall of the waist and the layer construction was inner layer of PET (1) (160μ)/intermediate layer of EVOH (40μ)/outer layer of PET (1) (100μ).

Next, the bottles thus made or filled with water containing carbon dioxide and the carbon dioxide gas permeability was measured with the passage of time. The results are shown in Table 3.

Method of Evaluation (1) Permeability of Carbon Dioxide Gas

A container was filled with a saturated aqueous carbon dioxide solution having a vapor pressure of 4 atms. at 20° C. and sealed. The container was put in a sealed box and the content of the box was purged with nitrogen gas, the moisture of which had been adjusted to RH of 65%. Carbon dioxide gas which permeated through the container wall was detected by Permatran C-IV carbon dioxide gas permeability measurement device manufactured by Modern Controls Co., Ltd. and the number of days until carbon dioxide gas in the container reached 15% loss was measured.

TABLE 3

|  | Example 12 | Comparative Example 6 |
|---|---|---|
| Day until carbon dioxide gas in the container reached 15% loss | 33 weeks | 24 weeks |

From the above table, it is understood that the storability of the container according to the present invention is improved.

EXAMPLE 13 AND COMPARATIVE EXAMPLE 7

Using a co-injection molding device equipped with three injection cylinders A, B and C, polypropylene (melt flow index at 230° C. under a load of 2160 g=7.0, specific gravity at 23° C.=0.91) was charged in cylinder A, maleic anhydride-graft modified polypropylene (amount of maleic anhydride for modification=0.01 mol%, melt flow index at 230° C. under a load of 2160 g=7.0, specific gravity at 23° C.=0.91) was charged in cylinder B and Composition 5 prepared in Example 12 was charged in cylinder C.

A mold for 4 cups (cup opening diameter of 72 mm, bottom diameter of 65 mm, height of 35 mm, wall thickness of 285μ) was mounted and the temperature was set at 20° C. The barrel temperature of cylinders A and B was set at 240° C. and that of C at 220° C.

First, polypropylene was injected from cylinder A so as to fill 85% of the mold volume set at a temperature of 240° C. through a hot runner block, a nozzle through and a gate. Next, the modified polypropylene was injected from cylinder B in a similar manner so as to fill 7.5% of the mold volume, then Composition 5 was injected from cylinder C in a similar manner so as to fill 7.5% of the mold volume, and finally polypropylene was injected in a small quantity to seal the bottom outer layer with polypropylene. After dwelling and cooling, the mold was opened and the obtained 4 multi-layer cup-like containers were withdrawn.

The construction was, starting from the outermost layer, polypropylene (225μ)/modified polypropylene (20μ)/Composition 5 (40μ)/modified polypropylene (20μ)/polypropylene (225μ) and the total thickness was 530μ.

Next, a multilayer container was prepared in a similar manner except that EVOH (ethylene unit content of 32 mol%, melt flow index at 190° C. under a load of 2160 g of 5.1 g/10 mins., melting point of 181° C.) was used in place of Composition 5 (Comparative Example 7). The layer construction was, starting from the outermost layer, polypropylene (225μ)/modified polypropylene (20μ)/EVOH (40μ)/modified polypropylene (20μ)/polypropylene (225μ).

The container was sealed with an aluminum foil lid and steam-treated at 120° C. in a retort pot for 30, 60 and 120 minutes. Then, in such a state that water was charged in the inside of the cup, the opening of the cup was connected with a device for measuring oxygen gas permeability and the rate of oxygen permeability was measured. The results are shown in Table 4. The rate of oxygen permeability after the retort treatment was approximately three times or less than that of a container which was not retorted, and gas permeability resistance was sufficient for storage of food.

TABLE 4

|  | Intermediate Layer | Oxygen Permeability Rate of Cup ($\times 10^{-2}$ cc/container · day · atm) | | | |
|---|---|---|---|---|---|
|  |  | Non-Retorted | Retorted for 30 mins. | Retorted for 60 mins. | Retorted for 120 mins. |
| Example 13 | Composition 5 | 0.30 | 0.35 | 0.50 | 0.8 |
| Comparative Example 7 | EVOH | 0.32 | 20 | 50 | 108 |

EXAMPLE 14 AND COMPARATIVE EXAMPLE 8

Polyethylene terephthalate resin (melt flow index at 270° C. under a load of 2160 g of 2.0 g/10 mins., 265° C.), Composition 1 (melt flow index at 190° C. under a load of 2160 g, 0.7 g/10 mins.) of Example 1 described above and, as an adhesive resin, modified ethylene-vinyl acetate resin having a vinyl acetate content of 24 wt% and a maleic anhydride modification degree of 1.1 wt% were supplied to 3 extruders to mold a multi-layer pipe having an outer diameter of 25 mm, composed of 3 kinds/3 layers of polyethylene terephthalate resin/adhesive resin/Composition 1/adhesive resin/polyethylene terephthalate resin. This pipe was cut into a length of 130 mm and the bottom was formed at one end of the pipe. Thereafter the neck was processed so as to make a cap mountable to prepare a closed-end parison.

This closed-end parison was heated to 110° C. and stretched 2.2 times with stretching rods in the axis direction and almost simultaneously, nitrogen gas under a pressure of 12 kg/cm$^2$ was blown to stretch 2.8 times in the peripheral direction. Thus, a biaxially stretched blow bottle having a volume of 1.5 liters was formed. In this case, the blow mold was kept at 15° C. using chilled water. Then after dwelling, the mold was opened to give a multi-layer bottle (Example 14).

For purpose of comparison, a multi-layer bottle having the same size was produced in a similar manner except for using EVOH (ethylene unit content of 32 mol%, melt flow index at 190° C. under a load of 2160 g, 1.3 g/10 mins.) in place of Composition 1 (Comparative Example 8).

The layer construction of the wall and the time required until the carbon dioxide loss reached 15% are shown in Table 5.

TABLE 5

|  | Layer Construction | Total Thickness (μ) | Time required for 15% loss of carbon dioxide |
|---|---|---|---|
| Example 14 | PET(100μ)/adhesive resin (6μ)/Composition 1 (20μ)/adhesive | 372 | 32 weeks |

TABLE 5-continued

|  | Layer Construction | Total Thickness (μ) | Time required for 15% loss of carbon dioxide |
|---|---|---|---|
| Comparative Example 8 | resin (6μ)/PET (240μ) PET(100μ)/adhesive resin (6μ)/EVOH (20μ)/adhesive resin (6μ)/PET (240μ) | 372 | 23 weeks |

It is evident that the bottle according to the present invention has extremely excellent carbon dioxide gas barrier properties.

EXAMPLE 15 AND COMPARATIVE EXAMPLE 9

Three extruders A, B and C were used; isotactic polypropylene resin (melt index at 190° C. under a load of 2160 g= 0.8 g/10 mins., specific gravity at 23° C.=0.91) was charged in extruder A, maleic anhydride-graft modified polypropylene (amount of maleic anhydride for modification=0.001 mol%, melt index at 190° C. under a load of 2160 g=1.0, specific gravity at 23° C.=0.91) was charged in extruder B at a barrel temperature of 220° C. and Composition 1 prepared in Example 1 was charged in extruder C at a barrel temperature of 220° C. The mixture was combined in a die for a multi-layer circular parison kept at a temperature of 240° C. so as to form 3 kinds/5 layers of isotactic polypropylene/maleic anhydride-graft modified polypropylene/Composition 1/maleic anhydride-graft modified polypropylene/isotactic polypropylene to form a multi-layer parison. The parison was subjected to direct blow molding (blow molding of melt parison) to form a multi-layer bottle (Example 15).

Next, a multi-layer bottle was molded in a similar manner except for using EVOH Composition 1 (ethylene unit content of 32 mol%, melt index of 1.3 g/10 mins.) (Comparative Example 9).

The bottle had a weight of 22 g and an inner volume of 500 ml. The average thickness and construction was polypropylene (1–50μ)/maleic anhydride-graft modified polypropylene (20μ)/Composition 1 (30μ)/maleic anhydride-graft modified polypropylene (20μ)/polypropylene (150μ) (Example 15) and polypropylene (150μ)/maleic anhydride-graft modified polypropylene (20μ)/EVOH (30μ)/maleic anhydride-graft modified polypropylene (20μ)/polypropylene (150μ) (Comparative Example 19).

Next, water was charged in each bottle and sealed with a cap and an inside plug. After it was steam-treated at 120° C. in a retort pot for 30, 60 and 120 minutes, the bottle was withdrawn and the opening of the cup was connected with a device for measuring oxygen gas permeability and the rate of oxygen permeability was measured. The results are shown in Table 6.

that of a container which was not retorted, and the gas barrier property was sufficient for storage of food.

EXAMPLE 16

Using a multi-layer injection molding machine equipped with 3 injection cylinders, 3 kinds of resins were injected into an inverted conical mold having an opening of 65 mm and a height of 65 mm to give a parison having a 5 layer structure of polypropylene/adhesive resin/composition/adhesive resin/polypropylene. Polypropylene and the adhesive resin used herein were E-103D manufactured by Ube Industries, Ltd. and Admer QB530 manufactured by Mitsui Petrochemical Industries, Ltd. The composition was EVOH containing the drying agent grains shown in Example 1 (Composition 1). The parison was subjected to direct blow molding to prepare an almost cylindrical container having an opening of 65 mm and a height of 70 mm. The construction thickness was 300/8/45/8/300μ. Water was charged in the container and a metal-made lid was mounted by double-seaming.

After the container was treated in a retort pot at 120° C. for 30, 60 and 120 minutes, water was charged in the inside of the cup. In such a state, 2 pipes were mounted to the lid of the container and connected with a device for measurement of oxygen permeability. The results are shown in Table 7.

A part of the cup container prior to the retort treatment was cut, taken out and heated in xylene at 120° C., whereby the polypropylene and the adhesive resin were melted out to give a film of the composition of the present invention in the container. The dispersion state of the powders in this film was observed by an optical microscope. With respect to 10 samples collected from the wall of the container at different locations, the average diameter of grains having a long diameter of 10μ or more at a region of 200μ×200μ were measured and the volume-area average diameter was calculated to be 17.5μ.

EXAMPLE 17

Molding was performed in a manner similar to Example 16 except that a parison having a 3 layer structure of polypropylene/Composition 1 of Example 1/polypropylene was prepared using a multi-layer injection molding machine equipped with 2 injection cylinders. Thus a container having a thickness construction of 300/45/300μ was prepared. Also with respect to the container, a metal-made lid was mounted and the rate of oxygen permeability after the retort treatment was measured. The results are shown in Table 7.

COMPARATIVE EXAMPLES 10 AND 11

A container having a thickness construction of 300/45/45/45/300μ was obtained in a manner similar to Example 16 except that EVOH (ethylene unit content of 32 mol%, melt index of 1.3 g/10 mins., melting point

TABLE 6

|  | Intermediate Layer | Oxygen Permeability Rate of Cup (× $10^{-2}$ cc/container · day · atm) | | | |
|---|---|---|---|---|---|
|  |  | Non-Retorted | Retorted for 30 mins. | Retorted for 60 mins. | Retorted for 120 mins. |
| Example 15 | Composition 1 | 0.40 | 0.47 | 0.67 | 1.1 |
| Comparative Example 9 | EVOH | 0.43 | 27 | 67 | 144 |

The rate of oxygen permeability after the retort treatment of Example 15 was approximately comparable to of 181° C.) was used in place of Composition 1 (Comparative Example 10).

Further a container having a thickness construction of 300/45/45/45/300μ was obtained in a manner similar to Comparative Example 10 except that an adhesive resin (Admer QB530) containing 10 wt% of fine powders of drying agent (disodium phosphate) was used in place of the adhesive resin of Comparative Example 10 (Comparative Example 11).

With respect to the containers of Comparative Examples 10 and 11, each metal-made lid was mounted thereto in a manner similar to Example 16 and the rate of oxygen permeability after the retort treatment was measured. The results are also shown in Table 7.

The rates of oxygen permeability of the containers of Examples 16 and 17 after the retort treatment were lower than those in Comparative Examples 10 and 11 and excellent in storability.

TABLE 7

| | Oxygen Permeability Rate of Cup ($\times 10^{-2}$ cc/container · day · atm) | | | |
|---|---|---|---|---|
| | Non-Retorted | Retorted for 30 mins. | Retorted for 60 mins. | Retorted for 120 mins. |
| Example | | | | |
| 16 | 0.21 | 0.22 | 0.25 | 0.3 |
| 17 | 0.21 | 0.23 | 0.24 | 0.3 |
| Comparative Example 10 | 0.21 | 3 | 12 | 30 |
| Comparative Example 11 | 0.21 | 1 | 5 | 10 |

What is claimed is:

1. A composition comprising a matrix of an ethylene-vinyl alcohol (EVOH) copolymer having dispersed therein a granular drying agent in a particulate state, wherein among the dispersed grains of drying agent, the volume-area average diameter of the grains having a long diameter of at least 10μ is not greater than 30μ and the ratio of EVOH to said drying agent ranges from 97:3 to 50:50.

2. A composition as claimed in claim 1 wherein said ethylene-vinyl alcohol copolymer is a saponified ethylene-vinyl acetate copolymer having an ethylene unit content of 25 to 60 mol % and a saponification degree in the vinyl acetate component of at least 96%.

3. A composition as claimed in claim 1 wherein said drying agent is a salt capable of forming a hydrate.

4. A composition as claimed in claim 1 wherein said drying agent comprises as a main ingredient(s) at least one selected from monosodium phosphate, disodium phosphate, trisodium phosphate, trilithium phosphate and sodium pyrophosphate or a mixture of at least two of them.

5. A multi-layer structure comprising a layer of a composition comprising a matrix of an ethylene-vinyl alcohol (EVOH) copolymer having dispersed therein a granular drying agent in a particulate state, wherein among the dispersed grains of drying agent the volume-area average diameter of the grains having a long diameter of at least 10μ is not greater than 30μ ratio of said drying agent used in said composition is 3 to 50 wt%.

6. A multi-layer structure as claimed in claim 5 wherein said ethylene-vinyl alcohol copolymer is a saponified ethylene-vinyl acetate copolymer having an ethylene unit content of 25 to 60 mol % and a saponification degree in the vinyl acetate component of at least 96%.

7. A multi-layer structure as claimed in claim 5 wherein said drying agent is a salt capable of forming a hydrate.

8. A multi-layer structure as claimed in claim 5 wherein said drying agent comprises as a main ingredient(s) at least one selected from monosodium phosphate, disodium phosphate, trisodium phosphate, trilithium phosphate and sodium pyrophosphate or a mixture of at least two of them.

* * * * *